(12) United States Patent
Narayanan V

(10) Patent No.: US 8,485,323 B2
(45) Date of Patent: Jul. 16, 2013

(54) CALIPER ASSEMBLY FOR DISC BRAKE SYSTEM

(75) Inventor: Lakshmi Narayanan V, Farmington, MI (US)

(73) Assignee: Akebono Brake Corporation, Farmington Hills, MI (US)

( * ) Notice: Subject to any disclaimer, the term of this patent is extended or adjusted under 35 U.S.C. 154(b) by 285 days.

(21) Appl. No.: 12/900,590

(22) Filed: Oct. 8, 2010

(65) Prior Publication Data

US 2012/0085597 A1    Apr. 12, 2012

(51) Int. Cl.
   *F16D 55/00*    (2006.01)
(52) U.S. Cl.
   USPC ... 188/73.31; 188/72.1; 188/73.1; 188/73.39; 188/250 B; 188/258
(58) Field of Classification Search
   USPC .......... 188/73.31, 73.1, 73.39, 73.46, 72.1, 188/71.1, 247, 258, 250 E, 250 G, 250 B
   See application file for complete search history.

(56) References Cited

U.S. PATENT DOCUMENTS

| | | | |
|---|---|---|---|
| 4,316,530 A | | 2/1982 | Gehlen et al. |
| 4,723,635 A | | 2/1988 | Okada et al. |
| 4,977,987 A | | 12/1990 | Schmidt et al. |
| 5,060,766 A | * | 10/1991 | Kondo ................. 188/73.39 |
| 5,111,914 A | | 5/1992 | Thiel et al. |
| 5,238,090 A | | 8/1993 | Weiler |
| 5,284,228 A | | 2/1994 | Weiler et al. |
| 5,330,035 A | | 7/1994 | Klimt et al. |
| 5,396,972 A | | 3/1995 | Grele |
| 5,890,566 A | * | 4/1999 | Yoshida et al. .............. 188/73.1 |
| 5,957,245 A | | 9/1999 | Anger et al. |
| 6,340,076 B1 | * | 1/2002 | Tsuchiya ................. 188/73.45 |
| 6,427,810 B2 | | 8/2002 | Schorn et al. |

(Continued)

FOREIGN PATENT DOCUMENTS

| | | |
|---|---|---|
| DE | 8611037 U1 | 4/1986 |
| DE | 8610698 U1 | 4/1987 |

(Continued)

OTHER PUBLICATIONS

TRW's Advanced Brake Caliper Design—Termed Thin-Wide Technology—Reduces Weight and Extends Brake Life (http://ir.trw.com/releasedetail.cfm?ReleaseID=270516) Oct. 8, 2009.

(Continued)

*Primary Examiner* — Pamela Rodriguez
(74) *Attorney, Agent, or Firm* — The Dobrusin Law Firm, PC

(57) ABSTRACT

A caliper assembly comprising: a brake pad comprising a carrier plate having two opposing faces and two opposing side edges each having an ear which is adapted to seat in pad locator indentations in a support structure, wherein on one face is friction material and on the opposing face is a projection adapted to seat in a matched recess in a caliper body; a support structure having at least two pad locator indentations for receiving the ears located on the brake pad and at least two caliper body locator indentations for seating two ears defined by the caliper body; and a caliper body having a recess for seating the projection on the opposing face of the brake pad and having two ears adapted to seat in the caliper body locator indentations of the support structure; and a clip which holds the brake pad in position.

20 Claims, 7 Drawing Sheets

U.S. PATENT DOCUMENTS

| | | |
|---|---|---|
| 6,920,965 B2 | 7/2005 | Burgdorf et al. |
| 7,201,258 B2 | 4/2007 | Schog et al. |
| 7,377,368 B2 | 5/2008 | Schog et al. |
| 7,431,132 B2 | 10/2008 | Schog et al. |
| 7,631,733 B2 * | 12/2009 | Roberts et al. ............... 188/73.1 |
| 2005/0056496 A1 | 3/2005 | Reeves |
| 2005/0241893 A1* | 11/2005 | Goodreid ..................... 188/73.1 |
| 2007/0056812 A1 | 3/2007 | Haupt et al. |
| 2007/0215419 A1 | 9/2007 | Franz et al. |
| 2007/0240946 A1 | 10/2007 | Schorn et al. |
| 2009/0236187 A1 | 9/2009 | Bach et al. |

FOREIGN PATENT DOCUMENTS

| | | |
|---|---|---|
| DE | 4416815 | 5/1994 |
| EP | 1604127 | 6/2006 |
| EP | 1700047 | 10/2007 |
| WO | 2004/083669 | 9/2004 |
| WO | 2005/064188 | 7/2005 |

OTHER PUBLICATIONS

International Search Report PCT/IT03/00870 dated Aug. 24, 2004.

* cited by examiner

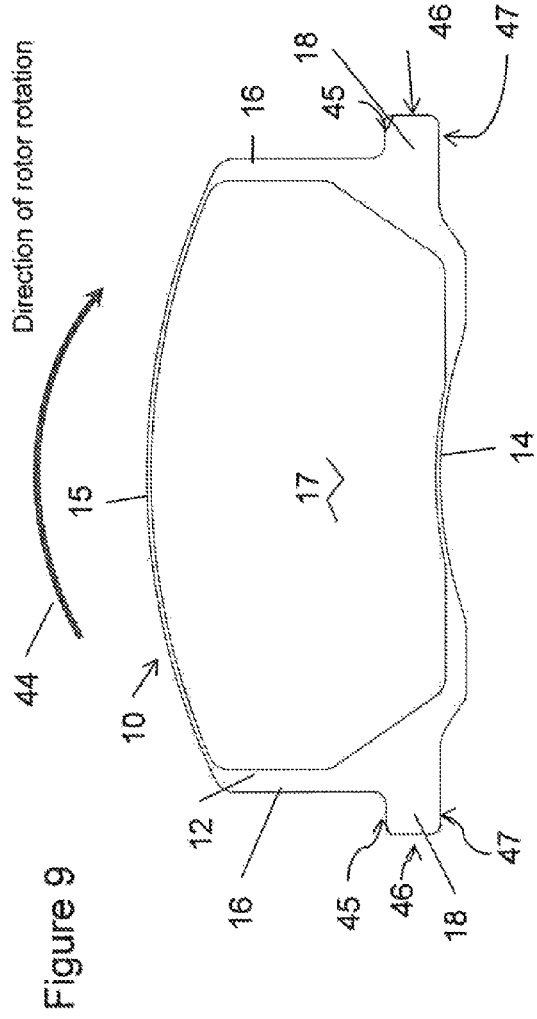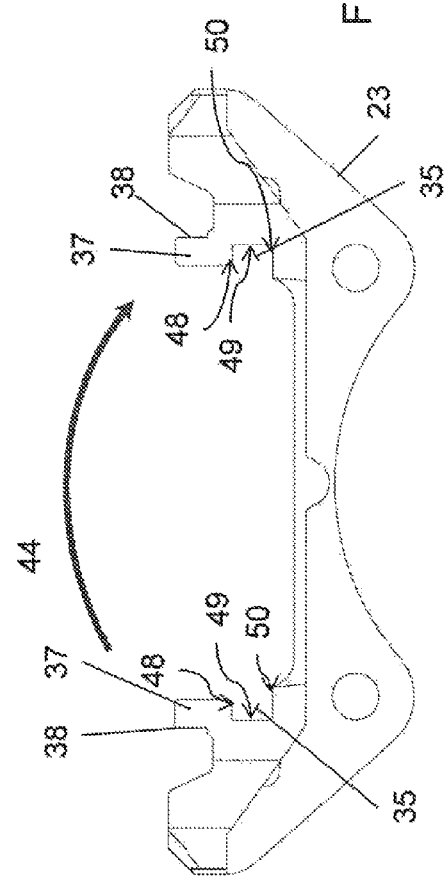

CALIPER ASSEMBLY FOR DISC BRAKE SYSTEM

FIELD OF THE INVENTION

The present invention relates to disc brake caliper assemblies and disc brake assemblies for use in motor vehicles which operate in push pull mode during braking.

BACKGROUND

Many motor vehicles are equipped with braking systems to allow operators to control, slow or stop the vehicles when desired. A commonly used braking system is a disc brake system. In general, a disc brake system comprises a caliper assembly and a brake disc. The caliper assembly is secured to a vehicle knuckle or suspension component and the disc is connected to the wheel hub of the vehicle. The disc comprises an annular braking band. The caliper assembly comprises a caliper body which comprises two lateral walls disposed on both sides of the disc which are connected by means of connecting members which straddle the brake disc and further comprises a support structure in the caliper assembly. When the vehicle is in motion the disc passes between the two lateral walls of the caliper. At least two brake pads are housed in the caliper assembly inside of the lateral walls, which are on the disc side of the lateral walls, and disposed on each side of the disc. The brake pads comprise a body of a friction material and carrier plate typically a metal such as steel, having disposed thereon a material which creates friction when in contact with the disc. The brake pads are seated in close proximity or adjacent to abutments in the caliper assembly so as to hold them in place during operation of the vehicle. The brake pads are displaceable in a direction perpendicular to the plane of the brake disc. The brake pads can be acted upon by thrusting means such as a hydraulic cylinder or piston to place the friction material of the brake pads in contact with the disc which creates friction force between the pads and the disc to slow down and/or stop the vehicle.

Generally disc brakes have two sets of abutments on leading and trailing sides of the lateral wall of the support bracket disposed in the inside wall of the lateral wall of the caliper, to transfer the braking loads from pads. A major portion (tangential force component) of the braking force is reacted by the trailing side abutments for a given direction of rotor rotation. The support bracket of a given caliper assembly requires an outer tie bar to share the braking loads between leading and trailing sides of the support bracket and manage deflections. In some wheel packages, the available axial clearance between the wheel and rotor is limited and does not allow packaging of an outer tie bar on the caliper support. However, from the functional stiffness/stress aspect of the support bracket/caliper assembly design, an outer tie bar is required. A currently used design to eliminate the outer tie bar on the support bracket of the caliper assembly is to design the brake pad to have a pull-push or push-pull feature that will connect the leading and trailing sides of the support bracket and help share the braking loads. The trailing side abutment is referred to as push and the leading side abutment referred to as pull. A push pull being defined as a brake design that has push loading occurring before pull loading and vice versa. Hereafter, the terms pull push and push pull will be used interchangeably. A brake that is capable of push pull operation can also be made to function as pull push. There are push pull designs available that use anchor pins attached to the support as abutments and also support brackets machined with rails and pressure plate having mating features to achieve push pull function. See U.S. Pat. No. 7,201,258; U.S. Pat. No. 7,377,368; U.S. Pat. No. 5,957,245; US 2007/0240946; US 2007/0056812; and US 2005/0056496 all incorporated herein by reference.

Brake pads used in existing push pull designs generally require the use of high strength materials for the brake pad carrier plate, such as high strength steel which is difficult to process for conventional manufacturing processes such as stamping.

What are needed are caliper bodies, support brackets, caliper assemblies and disc brake systems which provide the advantages of push pull braking function, utilize standard steel for the carrier plate of the brake pads and allow the elimination of the outer tie bar on the outboard side of the brake system.

SUMMARY OF THE INVENTION

In one embodiment the present invention relates to a caliper assembly comprising:
a brake pad comprising a carrier plate having two opposing faces and four edges, a top edge a bottom edge and two opposing side edges, wherein on one face is friction material and on the opposing face is a projection adapted to seat in a matched hole or recess in a caliper body, the two opposing side edges each having an ear which is adapted to seat in pad locator indentations in a support structure; a support structure adapted to affix the caliper assembly to the vehicle comprising a recess for seating at least one brake pad and at least two pad locator indentations adapted for receiving the ears located on the two opposing sides of the brake pad and at least two rails having abutment surfaces for mating with abutment surfaces of the two projections defined by the caliper body; and a caliper body having a hole or recess adapted for seating the projection on the opposing face of the brake pad and having two projections on each opposing side which are adapted to mate with abutment surfaces of the rails of the support structure; wherein the ears of the brake pad are seated in the pad locator indentations of the support structure, the projection on the opposing face of the brake pad is seated in the hole or recess located in the caliper body, and a clip which engages the opposing face of the brake pad and the caliper body and holds the brake pad in position with respect to the caliper body and the projections of the caliper body are located near or abutting to the rails of the support structure. In a preferred embodiment the clip is permanently affixed to one of the opposing faces of the brake pads or the caliper body, and more preferably affixed to one of the opposing faces of the brake pad.

In another embodiment the invention relates to a disc brake assembly comprising A) a caliper assembly as described hereinbefore and B) one or more pistons.

In another embodiment the invention relates to a disc brake assembly comprising A) a caliper assembly comprising: a brake pad comprising a carrier plate having two opposing faces and four edges, a top edge a bottom edge and two opposing side edges, wherein on one face is friction material and on the opposing face is a projection adapted to seat in a matched hole or recess in a caliper body, the two opposing side edges each having an ear which is adapted to seat in pad locator indentations in a support structure; a support structure adapted to affix the caliper assembly to the vehicle comprising a recess for housing at least one brake pad and at least two pad locator indentations adapted for receiving the ears located on the two opposing sides of the brake pad and two rails having abutment surfaces for mating with abutment surfaces of the two projections defined by the caliper body; and a caliper body having a hole or recess adapted for seating the projection on the opposing face of the brake pad and having at least one projection on each opposing side which are adapted to mate with abutment surfaces of the rails of the support structure; and a clip which engages the opposing face of the brake pad and the caliper body and holds the brake pad in position with respect to the caliper body and the projections of the caliper body are located near or abutting to the rails of the support structure; wherein the ears of the brake pad are seated in the pad locator indentations of the support structure, the projection on the opposing face of the brake pad is seated in the hole or recess located in the caliper body, and the projections of the caliper body are located near or abutting to the rails of the support structure; B) one or more pistons; wherein the caliper body comprises an inboard side which is disposed substantially parallel to the disc, an outboard side which is disposed substantially parallel to the disc and a bridge disposed over the disc and connecting the inboard and outboard side of the caliper body wherein the partial top edge of the outboard brake pad is abutted against the underside of the bridge of the caliper body.

In another embodiment the invention relates to a caliper body comprising an inboard wall which is adapted to be disposed substantially parallel to a disc of a disc brake system, an outboard wall which is adapted to be disposed substantially parallel to the disc of a disc brake system and a bridge which connects the inboard and outboard walls, wherein the outboard wall has a hole or recess adapted for seating the projection on the opposing face of a brake pad and having at least one projection on each opposing side which are adapted to abut to the abutment surfaces of the rails of a support structure.

In another embodiment the invention comprises a method of stopping or slowing a vehicle comprising;
1) providing a disc brake assembly as described herein; and 2) actuating the one or more pistons so as to cause the brake pads to engage the rotor; wherein the ear on the brake pad on the trailing side abuts the surface of the pad locator indentation on the trailing side, the projection on the opposing side of the carrier plate engages (abuts) with the hole or recess in the outboard wall of the caliper body and thereafter the leading edge projection of the caliper body abuts the abutment surface of the rail on the leading side of the support bracket.

It should be appreciated that the above referenced aspects and examples are non-limiting, as others exist within the present invention, as shown and described herein. The caliper bodies, support brackets, caliper assemblies and disc brake assemblies of the invention exhibit improved NVH performance; provide flexibility in design to allow adjustment of the stiffness of the braking performance to optimize component performance. The invention facilitates achievement of push pull braking function without requiring special brake pad designs and greater flexibility in the design of braking systems. The caliper bodies, caliper assemblies and disc brake systems of the invention allow the utilization of push pull design concepts without the need for a tie bar on the outboard side of a caliper assembly. The brake pads of used in the invention do not require the use of high strength materials for the carrier plate and offer greater flexibility in the selection of friction material for the brake pad.

DESCRIPTION OF THE DRAWINGS

FIG. 9 shows the abutments for a brake pad in relationship to rotor rotation direction.

FIG. 10 shows the abutments for a support bracket in relationship to rotor rotation direction.

DETAILED DESCRIPTION OF THE PREFERRED EMBODIMENT

Figure 1:
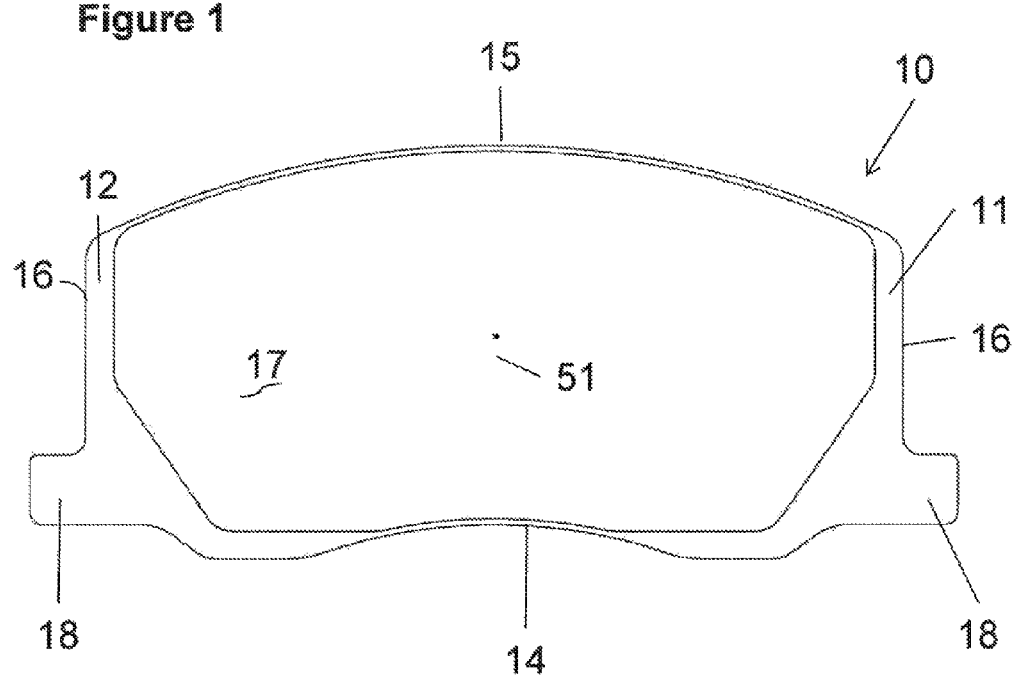
FIG. 1 is a view of one face of one embodiment of brake pad useful in the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present invention is directed to a unique solution for caliper bodies, caliper assemblies and disc brake systems containing such caliper assemblies which utilize push pull abutment designs. A caliper assembly functions to house brake pads of a disc brake system and upon activation of the disc brake system place the brake pads in contact with the disc as described hereinbefore. The caliper assembly comprises a caliper body, a support structure and brake pads disposed in the caliper assembly such that when pressure is applied through pistons to the brake pads they contact the disc. The caliper body comprises a wall disposed on each side of the disc each having an external face disposed away from the disc and an internal face disposed toward the disc. The two walls may be connected together by a bridge. The brake pads of the caliper assembly are housed in the support structure. The caliper bodies, caliper assemblies and disc brake assemblies of the invention can utilize an over the rotor pin design or a reverse pin design, such designs are well known in the art. The caliper assembly utilized is a floating caliper design. As used herein leading side in reference to brake pads, caliper bodies, caliper assemblies or support structures means the side of a caliper assembly that a fixed point on a rotor would first enter upon rotation. A trailing side means the side of a caliper assembly that a fixed point on a rotor would exit upon rotation. As used herein a push abutment is the abutment at the trailing side. As used herein the pull abutment is the abutment at the leading side. As used herein stiffness refers to the deflection of a component at a given force. As used herein inboard side refers to portions of the caliper assembly which are disposed on the side of the rotor which faces the longitudinal center line of the vehicle. Outboard refers to portions of the caliper assembly which are disposed on the side of the rotor which faces away from the longitudinal center line of the vehicle as used herein radial abutment means an abutment that reacts to the loads generated by radial forces. The radial abutment surface may change based on the relationship of the location of the brake pad ears with respect to the center of gravity or centroid of the brake pad. As used herein tangential abutment means an abutment that reacts to the loads generated by tangential forces. A tangential abutment of a disc brake pad is a surface of its mating part which bears a tangential component of the braking load. A tangential component of the braking load is one which is perpendicular to the line of symmetry of the pad pressure plate. A radial abutment of a disc brake pad is a surface of its mating part which bears a radial component of the braking load. A radial component of the braking load is one which is parallel to the line of symmetry of the pad pressure plate. As used herein an abutment surface means a surface of a brake pad, a rail of a support structure, an indentation of the support structure or a projection of a caliper body adapted to transfer load to another component of the assemblies of the invention during braking. An abutment is a pair of abutment surfaces abutting to one another during braking. An abutment can be described by its location with respect to the direction of rotation of the disc, that is leading or trailing, and by which forces the abutment transfers, tangential or radial. The present invention is illustrated in a number of exemplary embodiments, as discussed hereinafter. In the general discussion to aid in understanding of the discussion reference to the figures appended hereto may be made. Reference to the figures and reference numbers contained therein are provided to illustrate the invention and it is not intended to limit the description or claims appended hereto to such illustrated embodiments. Each of the components introduced above will be further detailed in the paragraphs below and in descriptions of illustrative examples/embodiments.

The brake pad 10 further comprises one or more projections 19 disposed on the face 13 of the brake pad carrier plate opposite the face 12 with the friction material disposed thereon, hereinafter the opposing face 13. The projection may act to transfer force to the caliper body. A projection is of a size and shape to function and define where the pad is located with respect to the inside face of the outboard wall of the caliper body 29 and to transfer the force or load during braking. The projections seat in a recess or a hole 34 in the adjacent wall of the caliper body. The projections can be located in any location of the designated carrier plate face to facilitate the projections performing its designated function. Preferably, the projections are generally disposed away from the edges of the brake pad carrier plate. Preferably, it is located in the central portion of the designated face of the brake pad carrier plate. The projection may have a height, the distance from the designated face of the brake pad carrier plate to the opposite end of the projection, which facilitates the projection performing its designate function. In preferred embodiments the height is about 2 mm or greater and more preferably 3 mm or greater. In preferred embodiments the height is about 5 mm or less and more preferably 4 mm or less. The projection may of any cross sectional shape, determined from the designated face of the brake pad carrier plate. Preferably the cross-sectional shape is round, oval or polygonal. Preferred polygonal shapes are squares, rectangles and hexagonal shapes. More preferred shapes are round, oval or hexagonal. Preferably the largest dimension of the projection in the plane parallel to the carrier plate face is chosen such that the projection can locate the brake pad with respect to the caliper body and in particular in the hole or recess in the caliper body wall and to further withstand the forces applied to the projection during braking. Preferably such largest cross-sectional dimension is about 8 mm or greater and more preferably about 9 mm or greater. Preferably such largest cross-sectional dimension is about 12 mm or less and more preferably about 11 mm or less.

In one embodiment, in addition to the projection 19 on the opposing face of the carrier plate of the brake pad it may also contain one or more smaller projections or nibs (22) adapted for matching holes or recesses 43 in the caliper body's outboard wall 30. Preferably the carrier plate contains two projections (nibs). The smaller projections function to aid in retaining the caliper body in proper relationship to the brake pads. The smaller projections are not intended to function to transfer forces to the caliper body during braking. Some forces may be applied to the smaller projections, in particular forces as a result of the clip holding the brake pad and caliper body together and during braking as the pad tries to rotate some force will be applied to the projections. These small or smaller projections are used to prevent the caliper body from dislodging or becoming loose in the event of the clip 20 failure and especially when used with a recess 34 on the outboard wall of the caliper body. In another embodiment, the caliper body is arranged such that a portion of the top edge of the carrier plate of the brake pad abuts against the underside of the bridge of the caliper body so as to aid in retaining the caliper body in the desired relationship to the brake pads.

The caliper assembly 28 may optionally include one or more clips 20 adapted to engage the caliper body outside wall 30 with the opposing face 13 of the carrier plate 11 and to hold the brake pad 10 in place with respect to the caliper body 29. Any clip which performs the function of holding the brake pad in place with respect to the caliper body may be used. The clip may be integral to the opposing face of the carrier plate for the brake pads or the caliper body or may be attached to the carrier plate or caliper body using any known attachment means. Alternatively the clip may be an independent part which is adapted to engage either of opposing face of the carrier plate for the brake pads or the caliper body Such attachment means include screws, rivets, peened nibs, and the like. The clip 20 may hold the brake pad 10 in place by exerting spring force on the caliper body 29 and/or the opposing face 13 of the carrier plate 11 of the brake pad 10 or by engaging one or more matching receptacles in the caliper body 29 and/or the opposing face 13 of the carrier plate 11 of the brake pad 10 in a manner which holds the brake pad 10 and caliper body 29 together. The clip may be attached to the opposing face of the carrier plate of the brake pad or the caliper body in any location which facilitates it performing the recited function. Preferably the clip located toward or near the bottom edge of the carrier plate. Preferably the clip is adapted to contact the caliper body on an outside face of the caliper body that is opposite to the face of the caliper body wall which is in contact with the opposing face of the carrier plate of the brake pad. In such embodiments the clip is located on the carrier plate below the wall of caliper body and wraps around the bottom edge of the wall of the caliper body so as to contact the outside wall of the caliper body. The clip may be biased to exert sufficient spring force on the outside wall of the caliper body or the opposing face of the carrier plate of, the brake pad to hold the brake pad in place with respect to the caliper body. The clip 20 may have a feature 40 which engages the outside wall 30 of the caliper body 29 adapted to hold the caliper body 29 and the brake pad 10 together. Such feature can comprise one or more curved portions (hooks). The caliper body or the opposing face of the carrier plate of the brake pad may contain a matching receptacle adapted to engage the clip so as to secure the brake pad and caliper body to one another. The matching feature can comprise one or more of projections, hooks, holds, or indentations, and the like adapted to engage the clip of the brake pad. There may be one more of the matched engagement features, preferably two or more and most preferably two matched engagement features. There may be one more of the matched receptacle features, preferably two or more and, most preferably two matched receptacle features. In one preferred embodiment, the clip contains hooks and the caliper body contains matching holes that engage the hooks of the clips. The clip may be biased to exert force on the caliper body. For instance the clip may be a spring clip or may have a spring attached to provide the biasing. In another embodiment the clip has one or more hooks which fits into one or more matching features and by engaging the holes holds the brake pad to the caliper body. Preferably force is required to engage and disengage the clip feature and the matching feature on the caliper body.

The two ears 18 on the opposing side edges 16 of the carrier plate 11 typically have more than one abutment surface to react or transfer braking forces. The abutment surfaces of the ears can form trailing tangential abutments, trailing radial abutments and leading radial abutments. The abutment surface of the ears which is on the far outside of the ear 45 will form a trailing tangential abutment with the support structure. In the embodiment wherein the ears are located below the center of gravity of the brake pad, below meaning closer to the center of the disc, the other abutment surfaces 46 and 47 defined by the ears form radial abutments with the support structure. The direction of rotation 44 of the disc and the relationship of the ears to the center of gravity or centroid of the brake pad determine if the abutment surfaces are leading radial or trailing radial. For example referring to FIG. 9, abutment surface 46 on the trailing side forms a trailing radial abutment with the support structure and abutment surface 47 on the leading side forms a leading radial abutment with the support structure. With respect to FIG. 9 the leading side is the side opposite the direction of the arrow and the trailing side is the side of the direction of the arrow. If the ears are above the center of gravity then the designated surfaces form the opposite abutment, that is abutment surface 45 on the trailing side forms a trailing radial abutment, abutment surface 46 on the trailing side forms a tangential abutment with the support structure and abutment surface 47 on the leading side forms a radial abutment with the support structure. Among brake pads 10 useful in the invention are those that have ears 18 from the opposing edges (sides) 16 of the carrier plate 11 of the brake pads (10) which are adapted to engage pad locator indentations 35 in the support structure 23. Preferably the ears in the carrier plate are of similar shape and size as the indentations in the support structure. The ears are adapted to locate and hold the brake pad in place with respect to the support structure and provide the abutment surfaces of the carrier plate of the brake pad. Any combination of the surfaces may serve as abutment surfaces (45, 46, 47 and 48) depending on the direction of rotation of the disc and the location of the ears with respect to the center of gravity or centroid of the brake pads. For the brake pad illustrated in FIG. 1 the centroid is illustrated by the point designated by reference number 51. The ears can have any shape and size which perform this function. In preferred embodiments the shape is generally rectangular or trapezoidal. The ears can have sharply defined corners but preferably have rounded corners to prevent unnecessary friction points and noise. The ears of the brake pads preferably define one or more abutment surfaces which engage mating abutment surfaces in the pad locator indentations so as to transfer force during braking.

In a preferred embodiment, one or more brake pad clips 36 are disposed in the one or more pad locator indentations 35 in the support structure 23 to hold the ears 18 from the opposing side edges 16 of the carrier plate 11 of the brake pad 10 in the pad locator indentations 35. Such clips are well known in the art and any known clips which perform the function of holding the brake pads in place may be utilized herein. Examples of brake clips and brake springs are disclosed in U.S. Pat. Nos. D483,709S; D489,655; 7,308,974; 7,467,693; and U.S. Patent Application Publication 2002/0189911, all of which are expressly incorporated by reference herein for all purposes. The clips can further comprise a means of retracting the brake pads after the one or more pistons are retracted. The brake pad clips which engage the two opposing brake pads can be disposed on one or both ends of the two brake pads.

In another embodiment, the invention is a caliper assembly. The caliper assembly 28 comprises two opposed caliper walls inboard 24 and outboard 30 and a bridge 25 over the disc. In one embodiment, the caliper assembly further comprises a support structure adapted to support the brake pads and to hold the brake pads in the caliper assembly. The support structure is connected to the knuckle or suspension component of the vehicle on the inboard side. In a reverse pin caliper design, the support structure 23 provides pins 26 on the inboard side on the caliper assembly 28 that hold the caliper housing (body) 29 in place. In such design the pins 26 may contain rubber bushes 27 which aid the caliper housing (body) 29 to slide towards rotor rotation direction in response to the braking forces by compressing the rubber bushes 27 against pins 26 and pin bosses and thus avoid twisting of body about the pins during braking when the projection on the opposing face 13 of the carrier plate engages and pushes against the hole or recess 34 on the outboard wall of the caliper body. The caliper housings and the support structure can be comprised of any material which allows such parts to perform their designated function. Preferably the parts are comprised of steel or cast iron or aluminum.

The outboard caliper body walls 30, contains a hole or recess 34 adapted to seat the projection 19 on the opposing face 13 of the carrier plate 11 of the brake pad 10. The recess and hole generally are of a size and shape to accommodate the projection on the opposing face of the brake pad carrier plate that is to allow the projection to properly seat in the hole or recess. Thus the size and shape of recess or hole adapted to seat the projection is preferably similar to the size and shape of the corresponding projection as described hereinbefore. Preferably the hole or recess engages the projection so as to transfer a portion of the force generated to the body as a result of applying the brakes. Thus the size of the hole or recess is chosen such that the projection fits closely inside the hole or recess. Preferably the clearance is about 0.8 mm or less and more preferably 0.7 mm or less. Preferably the clearance is about 0.4 mm or greater and more preferably 0.5 mm or greater.

The caliper body wall 30 with projections 32 that project downwardly from the perspective of the bridge 25 of the caliper body 29. The projections 32 are adapted to form abutment surface 39 to contact the abutment surfaces 38 of the rails 37 of the support structure 23 to hold the caliper body 29 in place with respect to the support structure 23 and when the brakes are applied transfer forces generated by braking to the support structure and thereby to the vehicle body. In a preferred embodiment, indentations 31 in the walls of the caliper body 30 result in formation of the projections 32. Such projections are located on the outboard side and optionally on the inboard side. Generally the projections are adapted to contact the support structure during braking. Preferably the projections on the caliper body project downward toward the support structure. The projections from the caliper body have a shape and a size sufficient to abut the rails of the support structure, hold the caliper body in place with respect to the support structure and to withstand the force exerted on the projections when the brakes are applied. Generally the shape is rectangular, square or trapezoidal. The projections of the caliper body define abutment surfaces 39 for engaging the corresponding abutment surfaces 38 on the rails 37 of the support structure during brake apply. These abutment surfaces also function as caliper body locator surfaces. The rails of the support structure define corresponding abutment surfaces for engaging the projections of the caliper body when the brakes are applied. The caliper body 29 may further comprise one or more holes or indentations 43 adapted to seat the small projections, nibs, 22 located on the opposing face 13 of the carrier plate 11 of the brake pads 10. Preferably there are two holes or indentations. Preferably the holes or indentations are of a shape or size that allows the brake pad to slide with respect to the caliper body and vice versa towards the tangential abutments when forces are applied to the brake pad. Preferably the indentations are generally oval in nature.

A support structure is a part that supports the brake pads as described herein and is mechanically affixed to the suspension on the inboard side and optionally to the caliper housing. The support structure generally supports both brake pads and is adapted to be disposed in some part over the disc. Any means of mechanically affixing the support structure to the suspension component may be utilized. The support structure 23 has a pair of pad locator indentations 35 adapted for seating the brake pads 10 in the support structure 23 and to locate the brake pads 10 properly. Preferably the pad locator indentations contain separate clips which serve to seat the ears of the brake pads into the support structure. In a preferred embodiment the ears of the brake pads seat tightly in the pad locator indentations of the support structure. The support structure contains one or more recesses which are adapted to seat to the brake pad within the structure and to define the pad locator indentations as described hereinbefore. Preferably the pad locator indentations defined by the recesses are substantially perpendicular to the plane of the faces of the brake pad and generally to the plane of the inside wall of the caliper housing or the support structure. The pad locator indentations define abutment surfaces which engage the ears of the brake pad. Each indentation forms three abutment surfaces. Referring to FIG. 10 which illustrates each abutment surface, 48 is the top abutment surface, 49 is the center abutment surface and 50 is the lower abutment surface. Depending on the direction of the rotation of the disc and the relationship of the ears of the brake pad to the center of gravity of the brake pad, the abutment surfaces of the support structure will form different abutments with the brake pad which are generally described by whether the pad locator indentations are on the leading or trailing side and whether the abutments during braking transfer tangential or radial loads. Such relationships are described with respect to the brake pad ears described hereinbefore. The ears on the brake pads define corresponding abutment surfaces that engage the corresponding abutment surfaces of the pad locator indentations. On the outboard side, and optionally on the inboard side of the support structure, are located a pair of rails on each side of the support structure adapted to form abutment surfaces for the projections of the caliper body. The size and the shape of rails of the support structure are chosen to abut the projections from the caliper body and to withstand the forces generated during braking. The rails are of sufficient size, height and width, that the rail can withstand the force applied during braking as a result of the abutment of the projection of the caliper body pushing against the abutment surface of a rail of the support structure. The rails of the support structure and the projections of the caliper body cooperate to transfer/react the force generated during braking. In preferred embodiments the distance from the two opposing abutments of the caliper body projections is set to be greater than the distance between the abutment surface of the rails of the support so as to create a combined gap between the projections and abutment surfaces of the rails sufficient to facilitate push-pull or pull-push abutment. The size of the combined gap and the relative location of the projections with respect to the rails can be adjusted to give the desired abutment of the projections to rails so as to give push-pull or pull-push abutment.

The rails define abutment surfaces for support structure which are located such that they mate with one side of the projections projecting from the caliper body during a braking event. The abutment surfaces function to transfer, tangential loads, on the abutment surface on the leading side during braking, this is referred to as the pull abutment. During braking, the abutment surface of the ear 18 of the carrier plate of the brake pad on the trailing edge of the carrier plate of the brake pad comes into contact with the corresponding abutment surface of the pad locator indentation in the support structure and the tangential loads are transferred to the abutment surface of the support structure. This is referred to a push abutment. With respect to each caliper assembly there are gaps between the corresponding mating abutment surfaces. When the brakes are not being applied a gap can be found between one or more of the pairs of abutment surfaces of the caliper body and the support structure and the brake pads and support structure. Preferably the total gap between the corresponding abutment surfaces is about 1.0 mm or less and more preferably about 0.6 mm or less. Preferably the total gap between corresponding abutment surfaces is about 0.35 mm or greater and more preferably about 0.55 mm or greater. The gaps are selected so as to easily assemble the parts and during braking facilitate transfer of forces at selected deceleration between the intended abutment surfaces of the support bracket/and/or caliper body and support bracket and/or brake pads.

The caliper housing preferably contains on the outside wall one or more mating receptacles for the spring located on the brake pads.

The caliper assembly can be used in any known disc brake system, including single and multiple piston floating calipers. The body or housing of the caliper assembly can comprise one or more parts assembled with fasteners. In one preferred embodiment, the body or housing can be an unitary structure. In one embodiment the invention comprises a disc brake system comprising a caliper assembly described herein; a rotor (disc) attached to a vehicle wheel; one or more pistons attached to a means for actuating the piston; wherein each of the two walls of the caliper body is disposed on either side of the rotor with the friction surface of the brake pad located facing the rotor and the caliper bridge is located over an outer edge of the rotor, and when the one or more pistons are actuated the brake pads friction material comes into contact with the rotor. Pistons and arrangement of the pistons useful in this invention are well known to the skilled artisan.

The disc brake systems according to the invention demonstrate compressive forces attendant to braking are transferred on the trailing side first mating surface. Disc brake systems according invention demonstrate the tensile forces attendant to braking are transferred by the leading side caliper body projections and support structure rails. Preferably the disc brake systems according to the invention operate such that the braking forces are primarily compressive and are transferred on the first mating surface on the trailing edge up to about 0.2 g deceleration. Preferably the disc brake systems according to the invention operate such that the braking forces are primarily tensile and transferred on the leading side first mating surface up to about 0.2 g deceleration.

FIG. 1 shows a brake pad 10 useful in the invention. The brake pad 10 has a carrier plate 11 having a first face 12 and a second face 13, not shown. The carrier plate has a bottom edge 14, a top edge 15 and two opposing side edges 16. On the one face 12 of the brake pad 10 is a friction material 17. Each opposing side edge 16 has an ears 18 adapted to seat the brake pad 10 in the support structure, not shown.

Figure 2:
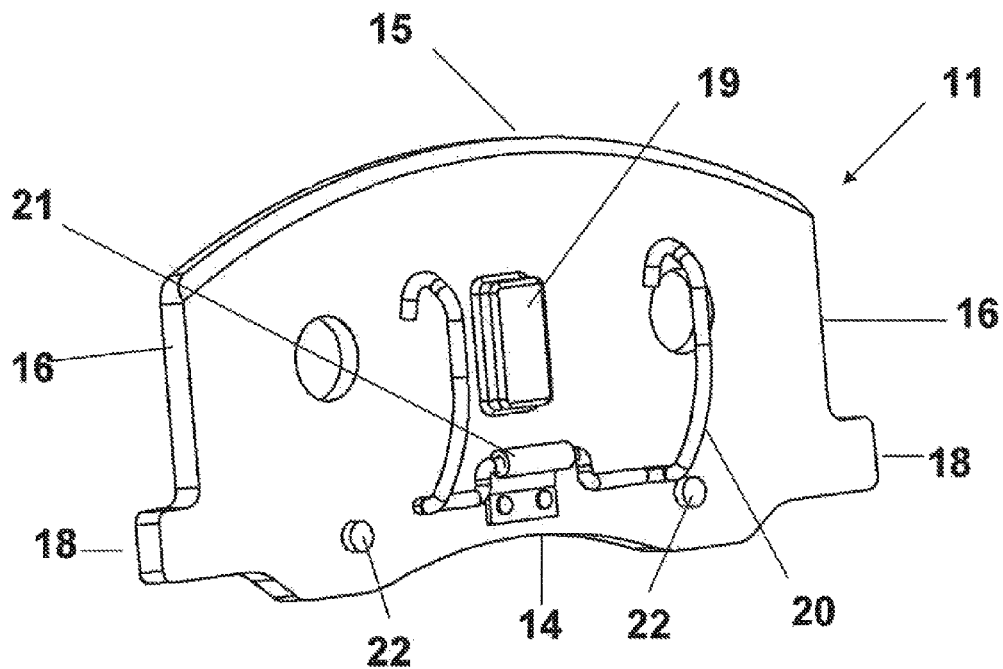
FIG. 2 is a view of a second face of one embodiment of brake pad useful in the invention.
Figure 3:
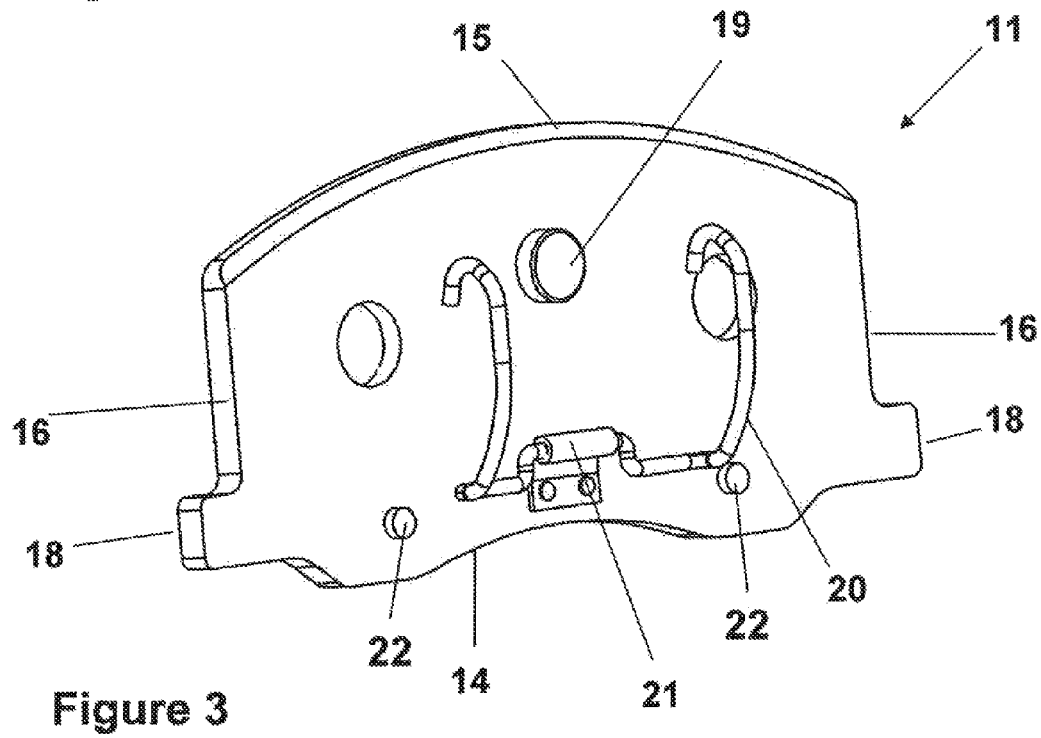
FIG. 3 is view of a second face of another embodiment of brake pad useful in the invention.

FIGS. 2 and 3 illustrate two embodiments of the opposing side of carrier plates of brake pads. The carrier plates have a bottom edge 14, a top edge 15 and two opposing side edges 16. In FIG. 2 the carrier plate 11 defines a projection 19 which is rectangular in shape. In FIG. 3 the carrier plate 11 defines a projection 19 which is circular in shape. Both Figures show a clip 20 connected to the carrier plate 11 by a clamp 21. Also shown are small projections 22 on the opposing side of the carrier plate 13.

Figure 4:
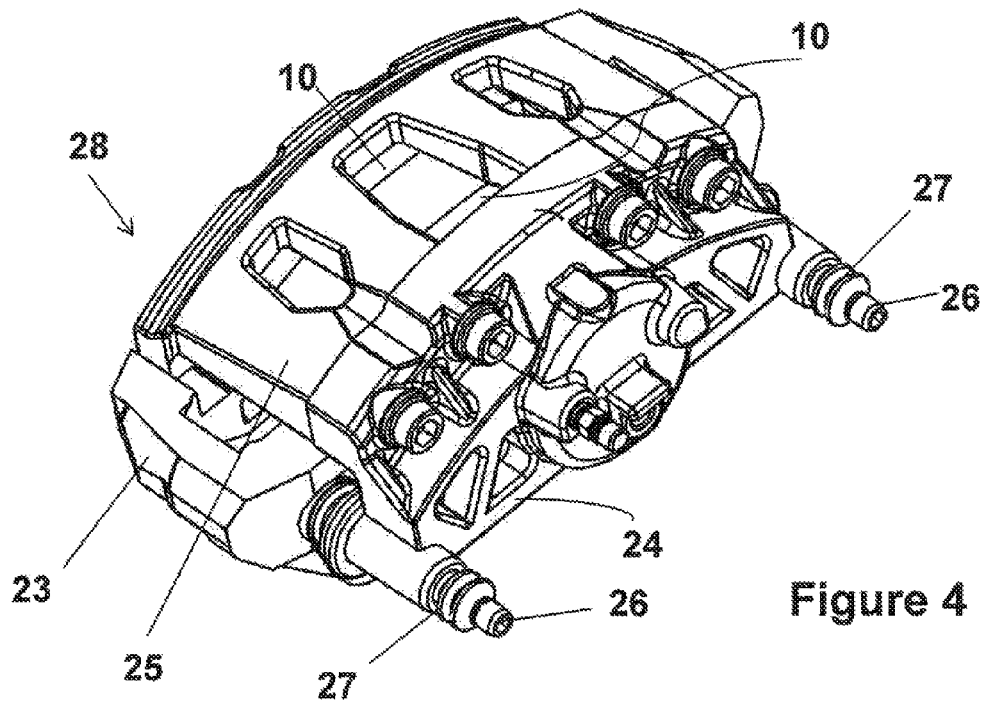
FIG. 4 is a view of a caliper assembly of the invention.

FIG. 4 shows a caliper assembly 28 comprising a support structure 23, inboard wall 24 and a bridge 25. The figure shows two pins 26 adapted to support the body assembly with two rubber bushes 27 disposed on the pins 26. Also shown are two brake pads 10.

Figure 5:
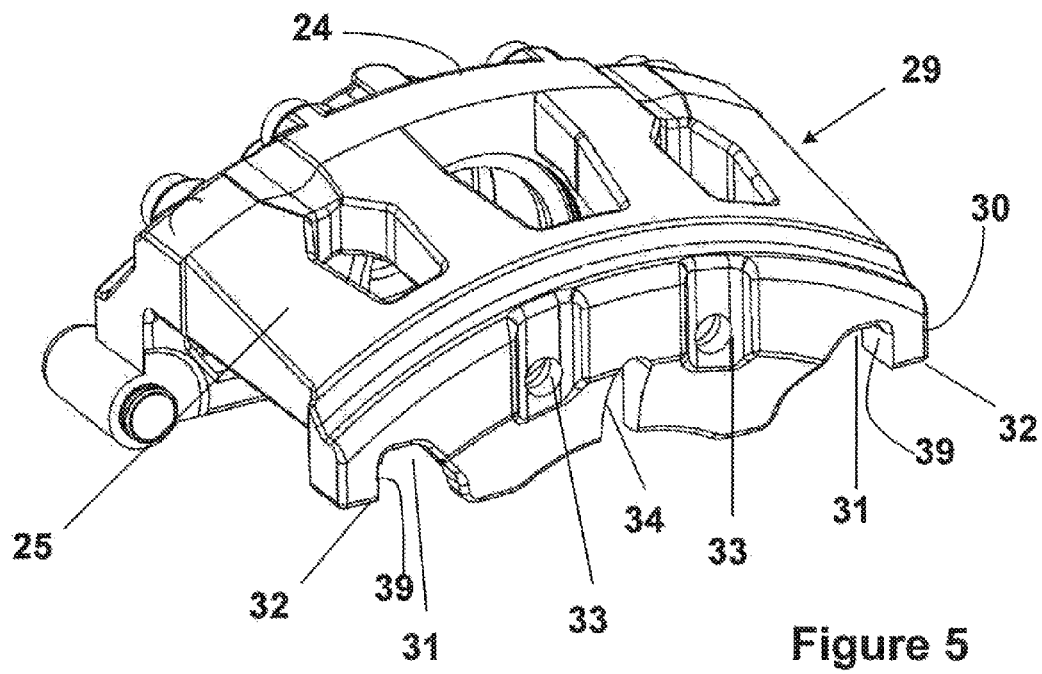
FIG. 5 shows a caliper body of the invention.

FIG. 5 shows a caliper body 29 comprising an inboard wall 24, an outboard wall 30 and bridge 25. The outboard wall 30 has two indentations 31 each defining a downward projection 32. Located in the outboard wall 30 are one or more matching receptacles 33 adapted for receiving a portion of the clip 20 from a brake pad 10. Also shown is a recess 34 in the caliper body outboard wall 30 adapted for seating a projection 19 from the opposing side 13 of a brake pad carrier plate 11. The projections 32 form abutment surfaces 50 adapted to abut the abutment surfaces 38 of the rails 37 of the support structure, the support structure components not shown in FIG. 5.

Figure 6:
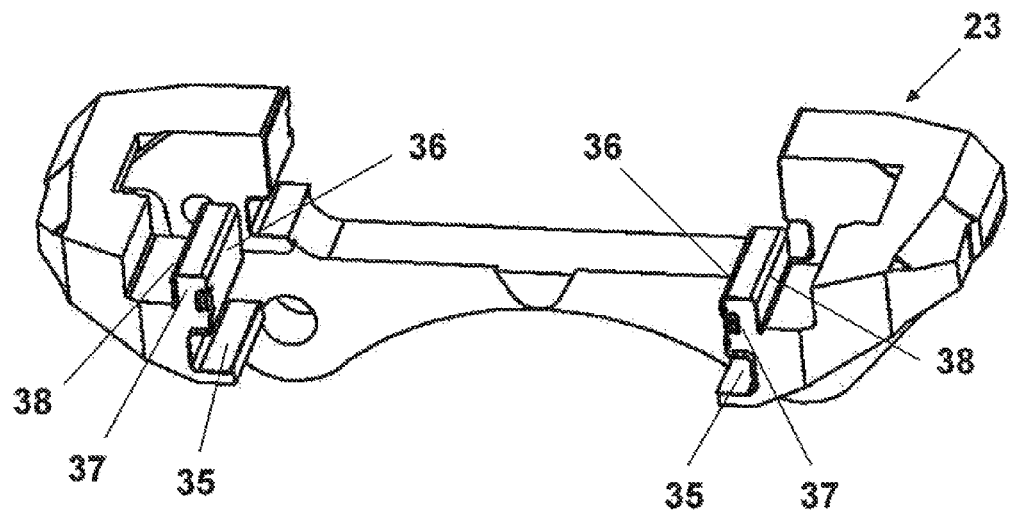
FIG. 6 shows a support structure useful in the invention.

FIG. 6 shows a support structure 23 useful in the caliper assembly 28 of the invention. The support structure 23 exhibits two pad locator indentations 35 having located therein two brake pad clips 36. The pad locator indentations 35 are adapted for holding a brake pad 10 in place in the support structure 23. Also shown are rails 37 adapted for creating abutment surfaces 38 for the caliper body projections 32 of the caliper body (not shown). FIG. 6 shows that the rails 37 are located only on the outboard side of the support structure 23.

Figure 7:
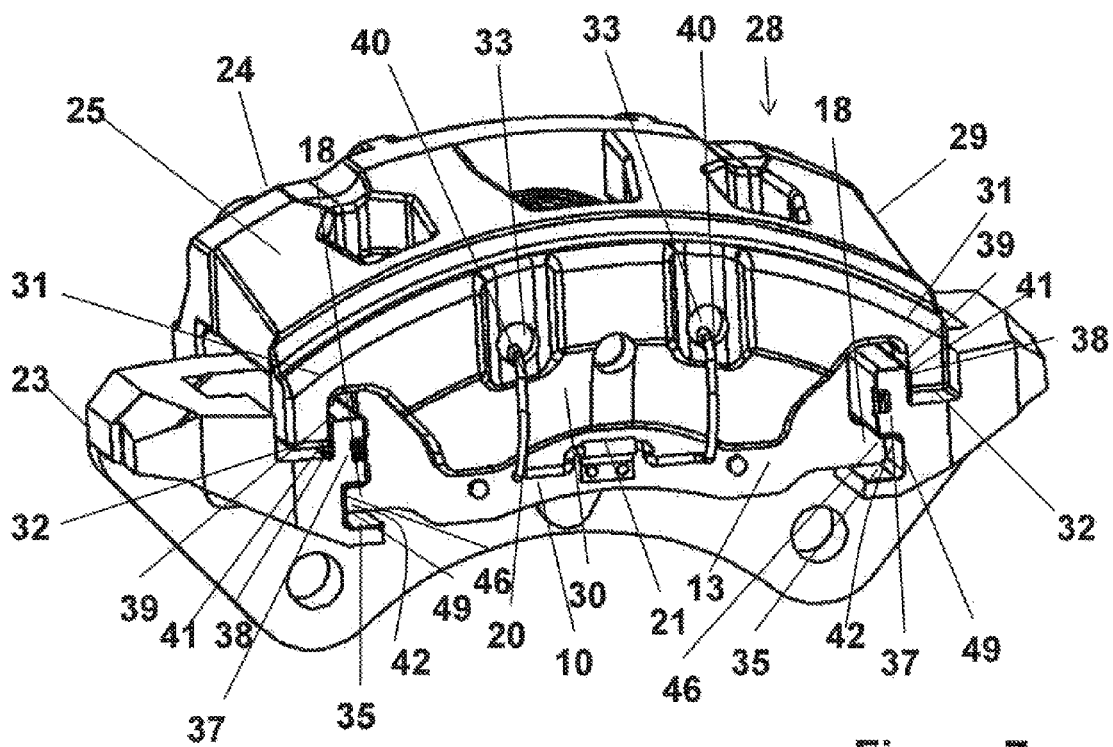
FIG. 7 shows a caliper assembly of the invention.
Figure 8:
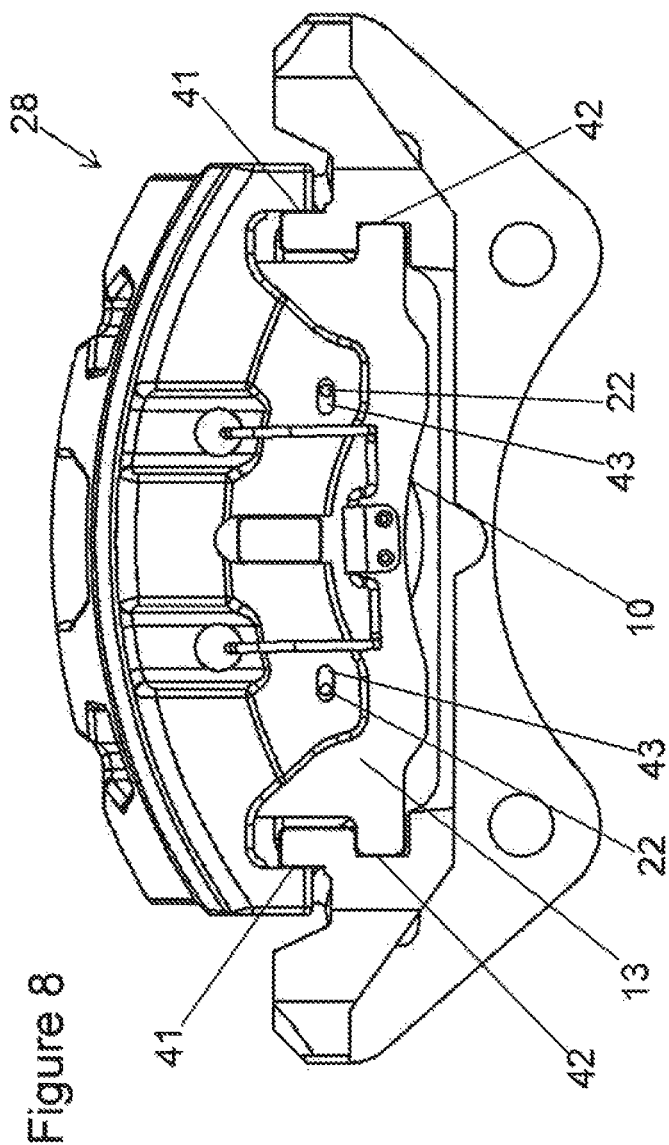
FIG. 8 shows a caliper assembly of the invention wherein relationship of projections from the carrier plate seated in recess in the outboard wall of the caliper body are shown.

FIG. 7 shows a caliper assembly 28 of the invention. Disposed in a support structure 23 is a brake pad 10, with the second (opposing face) 13 visible. Two ears (projections) 18 of the brake pad 10 are located in the pad locator indentations 35 of the support structure 23. Abutments 42 formed by the center abutment surface 46 of the ears 18 and the center abutment surface 49 of the pad locator indentations 35 are shown. Other abutments of the ears 18 of the brake pad 10 and the pad locator indentations 35 are described hereinafter. A caliper body 29 is disposed over the support structure 23 which comprises an inboard wall 24, a bridge 25 and an outboard wall 30. The caliper body projections 32 are each located outside of the two rails 37 in the vicinity of or abutting the abutment surfaces 38 in the support structure 23. Machined rails 37 of the support structure 23 are located inside of the caliper body projections 32. The abutment surfaces 39 of the caliper body projections 32 and the abutment surfaces 38 of the rail 37 form mating abutment surfaces 41. A clamp 21 holds a spring 20 on the opposing side 13 of the brake pad 10. The two hooked ends 40 of the clamp 21 are disposed in two receptacles 33 of the outboard wall 30 of the caliper body 29. FIG. 8 shows a similar structure to that shown in FIG. 4 with the addition of two slots 43 in the outboard wall 30 of the caliper body 29 adapted to seat the projections 22 of the opposing side of the carrier plate 13 of the brake pad 10. The mating abutment surfaces 42 of the carrier plate ears 18 of the brake pad 10 and the pad locator indentations 35. The mating abutment surfaces 41 of the projections of the caliper body 29 and the rails 37.

Figure 11:
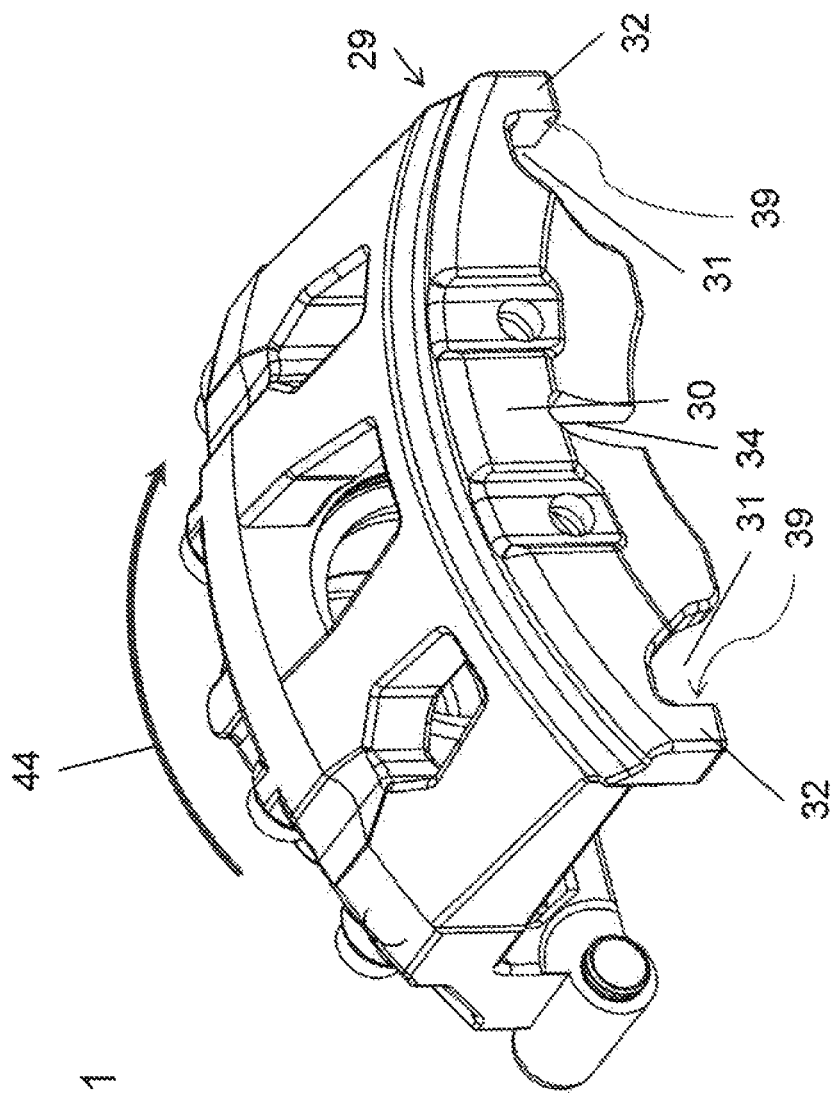
FIG. 11 shows the abutments for a caliper body in relationship to rotor rotation direction.

FIGS. 9, 10 and 11 show the tangential and radial abutment surfaces in relation to the direction of rotation of the rotor. FIG. 9 is an illustration of the abutment surfaces of a brake pad utilized in the invention, as illustrated in FIG. 1, with respect to clockwise rotor rotation. In FIG. 9 the arrow 44 shows the direction of rotation of the disc to be clockwise. For each ear there are shown three abutment surfaces, the top 45, the center (or end) surface 46, and the bottom surface 47. The ear 18 on the trailing side (right side or the side the arrow 44 is pointing toward) the brake pad 10 shows that surface 46 forms the trailing tangential abutment and the bottom surface 47 on the trailing side forms a trailing radial abutment. The ear 18 on the leading side (left side opposite to the direction of the arrow 44) of the brake pad 10 abutment surface 45 forms a leading radial abutment. FIG. 10 illustrates a support structure similar to FIG. 6 showing the abutments when the disc rotates in a clockwise manner as shown by arrow 44 Also shown are both pad locator indentations 35 having three abutment surfaces, the top abutment surface 48, the center abutment surface 49 and the bottom abutment surface 50. In the embodiment as shown by FIG. 9, abutment surface 49 on the trailing side (right) forms a trailing tangential abutment and abutment surface 50 on the trailing side forms a trailing radial abutment. The abutment surface 38 of the left rail 37 forms a leading tangential abutment. The top abutment surface 48 on the leading side (left) of the pad locator indentation 35 forms a leading radial abutment. FIG. 11 shows a caliper body 29 as shown in FIG. 5 with the abutments when the disc is rotating clockwise as shown by arrow 44. Shown is an outboard wall 30 having two projections 32 defined by to two indentations 31 the projections having abutment surfaces 39. The abutment surface 39 on the leading side (left) forms a leading tangential abutment 48 with the corresponding rail, not shown.

In general, during brake actuation, in response to the thrust from the brake pistons, the caliper pads generate tangential and radial forces and the forces are reacted by the leading and trailing abutments of the support bracket. Radial forces are generally of the order of about one eighth of the tangential force component.

In one of the embodiments of the current invention, during braking, the tangential and radial forces from the brake pads (10) are reacted by the leading abutments and trailing abutments of the support bracket. As the support bracket 23 deflects at the trailing side in response to the braking loads, the brake pad moves along with the trailing abutment and thus the projection 19 on the opposing face of the carrier plate 13 gradually takes up any gap between the projection 19 (FIG. 2) or (FIG. 3) and the recess or hole 34 in the caliper body outboard wall 30 and as the gap is fully taken up, the projection 19 starts pushing (sliding) the body 29 towards the trailing side of support bracket 23. The rubber bushes 27, where utilized help the caliper body 29 to slide towards the trailing side of support bracket 23 without twisting about the body about guide pins 26. As the caliper body 29 moves towards the trailing side of the support bracket 23, the gaps between the rails 37 and the projections of the caliper body 32 and the abutment surfaces (45, 46 and 47) of the ears 18 of the carrier plate 11 of the brake pad and the abutment surfaces (48, 49 and 50) pad locator indentations 35 are taken up to form abutments. In operation (during braking) the actual abutments formed are dictated by the relative size of the gaps, the direction of rotation of the rotor and the relationship of the location of the ears of the brake pad to the center of gravity of the brake pad. The gaps between the abutment surfaces can be engineered to define which abutments form first. Where the gaps between the abutment 38 of the rail 37 and the abutment 39 of the projection 32 of the caliper body 29 on the leading side are engineered to abut first, the caliper body pulls on the support structure and this is a pull abutment. Generally, when the force applied to the brake pad achieves a certain level the center abutment surface 46 of the ears 18 engage or abut to the center abutment surface of the corresponding surface 49 in the pad locator indentations on the trailing side (right side for FIGS. 9 and 10) to form a trailing tangential abutment. In this abutment the brake pad pushes on the support structure in the location of the abutment. This is called a push abutment. Where the system is engineered to have the pull abutment occur first this is known as a pull push design. During braking the brake pad experiences radial forces and radial abutments are formed between certain abutment surfaces of the ears 18 of the brake pad 10 and some of the abutment surfaces of the pad locator indentations 35 of the support structure. In the embodiment exemplified by FIGS. 9 and 10, the ears 18 are below the center of gravity of the brake pads 10. In this embodiment, the bottom abutment surface 47 of the ear 18 on the trailing side of the brake pad 10 abuts to the bottom abutment surface 50 of the pad locator indentations 35 on the trailing side to form a trailing radial abutment. The top abutment surface 45 of the ear 18 of the brake pad 10 on the leading side abuts to the to the top abutment surface 48 of the pad locator indentation 35 on the leading side of the support structure to for a leading radial abutment. In a push pull design the gaps described above are engineered such that the trailing tangential abutment occurs first compared to the leading tangential abutment. Preferably the transition from force being transferred at the first abutment to force being transferred at both abutments can be engineered, this is called the transition point. This transition point is preferably set to about 0.2 'g' equivalent deceleration level of the vehicle.

The preferred embodiment of the present invention has been disclosed. A person of ordinary skill in the art would realize however, that certain modifications would come within the teachings of this invention. Therefore, the following claims should be studied to determine the true scope and content of the invention.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A caliper assembly comprising
    a brake pad comprising a carrier plate having two opposing faces and four edges, a top edge a bottom edge and two opposing side edges, wherein on one face is friction material and on the opposing face is a projection adapted to seat in a matched hole or recess in a caliper body, the two opposing side edges each having an ear which is adapted to seat in a pad locator indentations in a support structure;
    the support structure adapted to affix the caliper assembly to a vehicle comprising a recess for seating at least one brake pad and at least two pad locator indentations adapted for receiving the ears located on the two opposing sides of the brake pad and at least two rails having abutment surfaces for mating with the abutment surfaces of at least two projections defined by the caliper body; and
    the caliper body having the hole or recess adapted for seating the projection on the opposing face of the brake pad and having the two projections on each opposing side which are adapted to mate with the abutments surfaces on the rails of the support structure; and
    a clip which engages the opposing face of the brake pad and the caliper body holds the brake pad and the caliper body in position with respect to each other;
    wherein the ears of the brake pad are seated in the pad locator indentations of the support structure, the projection on the opposing face of the brake pad is seated in the hole or recess located in the caliper body, and the projections of the caliper body are located near or abutting to the rails of the support structure.

2. A caliper assembly according to claim 1 wherein the support structure has the rails with abutment surfaces for mating with the abutment surfaces of the projections of the caliper body on an outboard side, of the support structure.

3. A caliper assembly according to claim 1 wherein the support structure has the rails with abutment surfaces for mating with the abutment surfaces of the projections of the caliper body on both of the outboard side and an inboard side of the support structure.

4. A caliper assembly according to claim 1 wherein the clip adapted to hold the pad in place with respect to the caliper body has one or more securing means that seat in one or more matching securing means receivers in the opposing side of the carrier plate of the brake pad or caliper body.

5. A caliper assembly according to claim 1 wherein the rails on the support structure forming their abutment surfaces transfer force from the caliper body to the support structure.

6. A caliper assembly according to claim 1 wherein the support structure does not contain an outer tie bar.

7. A caliper assembly according to claim 1 wherein the projection on the opposing side of the carrier plate has a cross-sectional shape which is round, oval or polygonal.

8. A caliper assembly according to claim 1 wherein the caliper walls contain one or more bores for one or more pistons.

9. A caliper assembly according to claim 1 that upon application of the brakes by contacting the friction material of the brake pad with a disc of a brake system, the ear of the brake pad located on a trailing side of the an outboard side initially abuts against an abutment surface of the pad locator indentations in the support structure on the trailing side of the support structure up to about 0.2 'g' deceleration, after which the projection of the caliper body located at the leading side on the outboard side starts to push against a rail on the leading side of the support structure as the projection on the opposing face of the carrier date engages with the recess or hole in the caliper body and pushes the caliper body toward the trailing side.

10. A caliper assembly according to claim 1 that upon application of the brakes by contacting the friction material of the brake pad with a disc of a disc brake system, the projection of the caliper body located on the outboard side initially abuts against a rail in the support structure on the leading side of the support structure up to about 0.2 'g' deceleration as the projection on the opposing face of the carrier plate engages with the hole or recess in the outboard wall of the caliper body, after which the ear of the pad located on a trailing side of an outboard side starts to push against the pad locator indentation on the trailing side of the support structure.

11. A caliper assembly according to claim 1 further comprising one or more pad securing clips disposed between one or more ears of one or more brake pads and an outer surface of the one or more pad locator indentations.

12. A caliper assembly according to claim 1, wherein the opposing side of the carrier plate of the brake pad further comprises two small projections and the caliper body has matching indentations or holes for receiving two smaller projections of the carrier plate.

13. A disc brake assembly comprising a caliper assembly according to claim 1 adapted to accommodate one or more pistons.

14. An assembly according to claim 13 where the opposing side of the carrier plate of the brake pad further comprises two small projections and the caliper body has matching indentations or holes for receiving the two small projections in the carrier plate.

15. A disc brake assembly comprising
A) a caliper assembly comprising
a brake pad comprising a carrier plate having two opposing faces and four edges, a top edge a bottom edge and two opposing side edges, wherein on one face is friction material and on the opposing face is a projection adapted to seat in a matched hole or recess in a caliper body, the two opposing side edges each having an ear which is adapted to seat in pad locator indentations in a support structure;

the support structure adapted to affix the caliper assembly to a vehicle comprising a recess for seating at least one brake pad and two pad locator indentations adapted for receiving the ears located on the two opposing sides of the brake pad and two rails having abutment surfaces for mating with the abutment surfaces of the two projections defined by the caliper body; and the caliper body having the hole or recess adapted for seating the projection on opposing face of the brake pad and having the two projections having the abutment surfaces on each opposing side which are adapted to abut with the abutment surfaces of the support structure;

wherein the ears of the brake pad are seated in the pad locator indentations of the support structure, the projection on the opposing face of the brake pad is seated in the hole or recess located in the caliper body, and the projections of the caliper body are located near or abutting to the rails of the support structure; and B) one or more pistons;
wherein the caliper body cc comprises an inboard side which is disposed substantially parallel to a brake disc, an outboard side which is disposed substantially parallel to the disc and a bridge disposed over the disc and connecting the inboard side and the outboard side of the caliper body wherein the partial top edge of an outboard carrier plate of the brake pad is abutted against the underside of the bridge of the caliper body.

16. A disc brake assembly according to claim 15 wherein the support structure has the rails with the abutment surfaces for mating with the abutment surfaces of the support structure on the outboard side of the support structure.

17. A this brake assembly according to claim 15 wherein the support structure has the rails with abutment surfaces for mating with the abutment surfaces of the projections of the caliper body.

18. A disc brake assembly according to claim 15 wherein the support structure does not contain an outer tie bar.

19. A method of stopping or slowing a vehicle comprising
1) providing the disc brake assembly of claim 15; and
2) actuating the one or more pistons so as to cause the brake pads to engage the brake disc;
wherein the ear on the brake pad on a trailing side abuts the abutment surface of the pad locator indentations on the trailing side of the support structure, the projection on the opposing face of the carrier plate contacts the hole or recess in the outboard side of the caliper body and pushes the caliper body towards the trailing side and thereafter the caliper body projection on a leading side abuts the rails of the support structure on the leading side.

20. A method of stopping or slowing a vehicle comprising
1) providing the disc brake assembly of claim 15; and
2) actuating the one or more pistons so as to cause the brake pads to engage the brake disc;
wherein the projection on the opposing face of the carrier plate contacts the hole or recess in the outboard side of the caliper body and pushes the body towards a trailing side and the caliper body projection on a leading side abuts the rails of the support structure on the leading side, and thereafter the ear on the brake pad on the trailing side abuts an abutment surface of the pad locator indentations on the trailing side of the support structure.

* * * * *

UNITED STATES PATENT AND TRADEMARK OFFICE
CERTIFICATE OF CORRECTION

PATENT NO. : 8,485,323 B2
APPLICATION NO. : 12/900590
DATED : July 16, 2013
INVENTOR(S) : Lakshmi Narayanan V It is certified that error appears in the above-identified patent and that said Letters Patent is hereby corrected as shown below:

In the Claims

Column 14 Line 32, after "seat in", delete "a"

Column 14 Line 39, after "mating with", delete "the"

Column 14 Line 59, after "outboard side", delete ","

Column 15 Line 25, delete "date" and insert --plate--

Column 15 Line 51, delete "where" and insert --wherein--

Column 16 Line 28, after "against", delete "the" and insert --an--

Column 16 Line 33, delete "this" and insert --disc--

Signed and Sealed this
Twenty-fourth Day of September, 2013

Teresa Stanek Rea
*Deputy Director of the United States Patent and Trademark Office*